K. G. WOLFF AND H. GRAF.
PULLEY.
APPLICATION FILED MAR. 4, 1919.
1,324,948.
Patented Dec. 16, 1919.
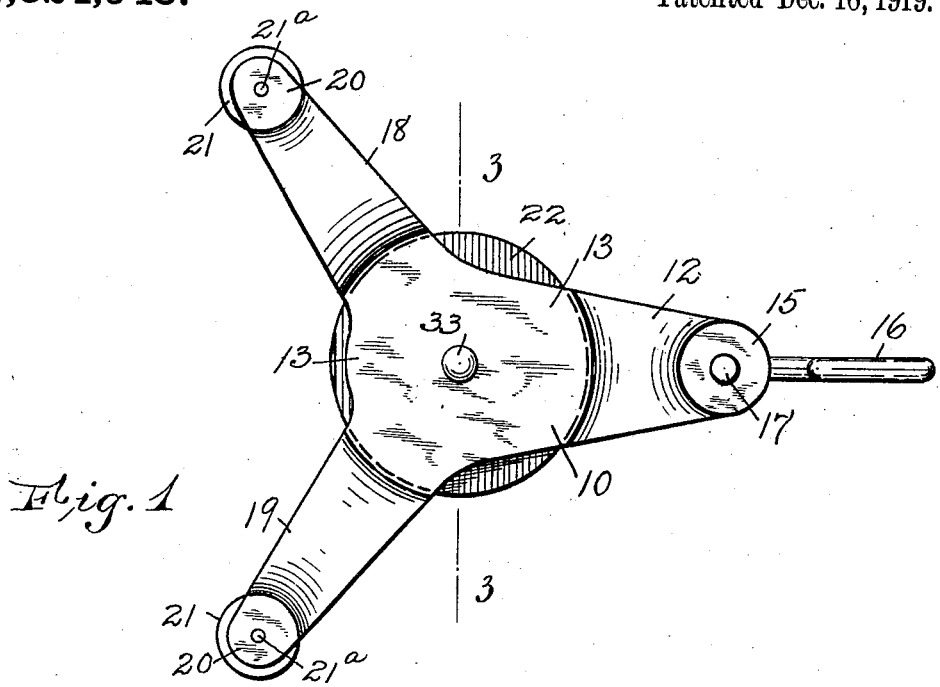
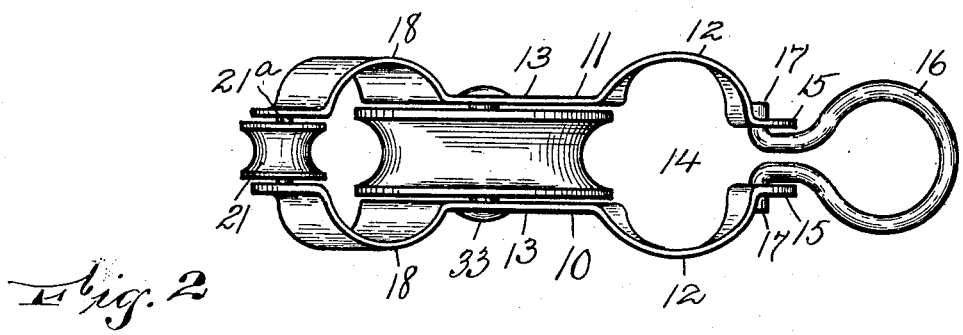
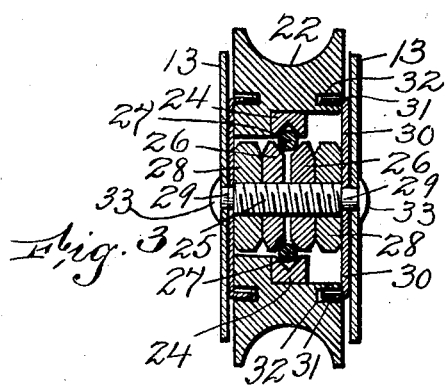
INVENTORS:
Karl G. Wolff
Herman Graf,
BY
Wm. H. Canfield
ATTORNEY.

UNITED STATES PATENT OFFICE.

KARL G. WOLFF AND HERMAN GRAF, OF NEWARK, NEW JERSEY.

PULLEY.

1,324,948. Specification of Letters Patent. Patented Dec. 16, 1919.

Application filed March 4, 1919. Serial No. 280,519.

*To all whom it may concern:*

Be it known that we, KARL G. WOLFF and HERMAN GRAF, citizens of Republic of Germany, and residents of Newark, county of Essex, and State of New Jersey, have invented certain new and useful Improvements in Pulleys, of which the following is a specification.

This invention relates to an improved pulley such as is used to support clotheslines, and the invention is described as such, although it will be understood that the device can be used in any situation where it is applicable, and we do not wish to be understood as limiting our invention to pulleys for clotheslines.

One object of the invention is to provide a pulley in which the rope can not ride off the wheel and become wedged in between the wheel and the bearing or frame, which, when the rope is heavy with clothes, causes much delay and inconvenience.

The invention is also designed to provide a pulley in which the close fitting pulley wheel is rotated freely and is not clogged with dirt or rust, as the construction is such as to protect its bearings.

The invention further consists of a frame in which the pulley wheel is mounted, the frame having supports for guiding pulleys and also having a means for attaching it to a suitable structure or support, the frame being constructed so as to be light and therefore easily portable, but, due to its formation, is strong and durable.

The invention is illustrated in the accompanying drawing, in which Figure 1 is a side view of the pulley and Fig. 2 is a top view thereof. Fig. 3 is a section on line 3—3 in Fig. 1.

The pulley has a frame consisting of side members 10 and 11, which are preferably identical in shape, each having an outwardly bulged part 12 projecting from the hub portions 13, whereby a substantially circular or enlarged opening 14 is provided which is large enough to permit the passage of any knotted or enlarged portions of the pulley line that goes over the pulley, the ends of the bulged parts 12 being flattened as at 15 and having means for securing an attaching device, and in the form shown this consists of an eye 16, which has its free ends 17 bent outward from one another, these free ends passing out through openings in the flat parts 15, the spring of the material holding the parts together, although, if desired, the ends 17 can be headed.

Diverging from the hub portions 13 are arms 18 and 19, which are bent outwardly and then inwardly and at their extremities are provided with the parts 20 which act as bearings for small rollers 21, these small rollers rotating freely and are preferably secured in place on the shafts 21ª. The bent parts of the arms 18 and 19 are wide enough to permit the passage of knotted parts of the rope and similar obstructions, and are divergent, being preferably arranged each at an angle of approximately 90° relative to each other on the opposite side of the hub from the projecting parts 12.

These arms provide a series of guards which act to guide the rope or line that is on the pulley wheel if, at any point in its movement, it has a tendency to run off the pulley. The rope is prevented from being seated between the pulley wheel and the arms by reason of the close fitting of the pulley wheel and the hub portions 13. The pulley wheel can be mounted in a number of ways, the preferred form being as illustrated in Fig. 3. The pulley wheel 22 is provided with the usual peripheral groove and is recessed, as at 23, to receive a ball race 24. The shaft 25 is arranged to receive the nuts 26, which are chamfered at their edges to form, with the ball race 24, a channel for the rotation of the balls 27. If desired, lock nuts 28 can be secured on the shaft 25.

The shaft 25 has reduced ends 29 forming shoulders against which the disks 30 fit, the disks 30 having inturned flanges 31 fitting loosely in the annular grooves 32 in the outside face of the pulley wheel 22. The distance between the shoulders caused by the reduced portions 29 is slightly greater than the width of the pulley wheel, so that the pulley wheel does not bind or bear tightly against the inner faces of the disks 30. The hub portions 13 receive the ends of the shaft 25, the shaft being preferably provided with heads 33 which securely hold the parts together.

It will be evident that the pulley wheel can not become separated from the side members or hubs of the frame, and it would therefore be impossible for the line or rope on the pulley wheel to become jammed between the pulley wheel and the frame.

We claim:

1. A pulley consisting of side members having a hub part and three divergent arms, the arms being bulged beyond the hub, one of said arms being adapted for securing the device to a support, a pulley wheel fitting substantially close in the hub, and small rollers mounted between the ends of the other two arms.

2. A pulley comprising side members formed each with a central hub and radial arms bulged transversely, a pulley wheel between the hubs, small rollers mounted between the ends of two of the sets of arms, rivets securing the members and the pulley wheel and rollers together and acting as axles for the pulley wheel and rollers, and means on the third arm for attaching the device to a support.

3. A pulley comprising side members formed each with a central hub and radial arms bulged transversely, a pulley wheel between the hubs, small rollers mounted between the ends of two of the sets of arms, rivets securing the members and the pulley wheel and the rollers together and acting as axles for the pulley wheel and the rollers, and an eye formed of a strand with its ends substantially close together and then bent outward, the third arm having openings which receive the outwardly bent ends of the eye.

In testimony that we claim the foregoing, we have hereto set our hands, this 3rd day of March, 1919.

KARL G. WOLFF.
HERMAN GRAF.